US012561253B2

(12) United States Patent
Harris et al.

(10) Patent No.: US 12,561,253 B2
(45) Date of Patent: Feb. 24, 2026

(54) MEMORY ACCESS OPERATIONS BASED ON SCORES

(71) Applicant: HEWLETT PACKARD ENTERPRISE DEVELOPMENT LP, Spring, TX (US)

(72) Inventors: Cameron Lee Harris, Cape Town (ZA); Kea Francis Barnes, Cape Town (ZA); Jacobus Joubert Swart, Cape Town (ZA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/786,790

(22) Filed: Jul. 29, 2024

(65) Prior Publication Data

US 2026/0030170 A1     Jan. 29, 2026

(51) Int. Cl.
| | |
|---|---|
| *G06F 12/08* | (2016.01) |
| *G06F 12/0891* | (2016.01) |
| *G06F 12/12* | (2016.01) |
| *G06F 12/126* | (2016.01) |
| *G06F 13/16* | (2006.01) |

(52) U.S. Cl.
CPC ........ *G06F 12/0891* (2013.01); *G06F 12/126* (2013.01); *G06F 13/1673* (2013.01)

(58) Field of Classification Search
CPC . G06F 12/0891; G06F 12/126; G06F 13/1673
See application file for complete search history.

(56) References Cited

U.S. PATENT DOCUMENTS

| | | | | |
|---|---|---|---|---|
| 10,503,645 | B1 * | 12/2019 | Sandler | ............... G06F 12/0868 |
| 11,494,321 | B1 * | 11/2022 | Yu | ....................... G06F 9/30043 |
| 2013/0275656 | A1 | 10/2013 | Talagala et al. | |
| 2018/0067869 | A1 * | 3/2018 | Yang | ................... G06F 12/0842 |

OTHER PUBLICATIONS

Wang, K., et al.; "Put an elephant into a fridge: optimizing cache efficiency for in-memory key-value stores"; May 1, 2020; 15 pages.
Xiao, G., et al.; "Efficient Streaming Language Models With Attention Sinks"; Sep. 29, 2023; 21 pages.

* cited by examiner

*Primary Examiner* — Masud K Khan
(74) *Attorney, Agent, or Firm* — Trop, Pruner & Hu, P.C.

(57) ABSTRACT

In some examples, a system includes a memory to store a first data structure containing data values received from one or more data sources, and a second data structure containing a plurality of scores associated with the data values, the data values in the first data structure arranged in a time order of the data values. The system includes a controller to: compute a score of the plurality of scores based on time distances of an associated data value to neighbor data values in the first data structure, and perform an access operation on the data values in the first data structure based on the plurality of scores.

13 Claims, 6 Drawing Sheets

400

500

Storage Medium

502 Data Values Reception Instructions

504 Data Values Buffering Instructions

506 Scores Computation Instructions

508 Scores Storage Instructions

510 Access Operation Instructions

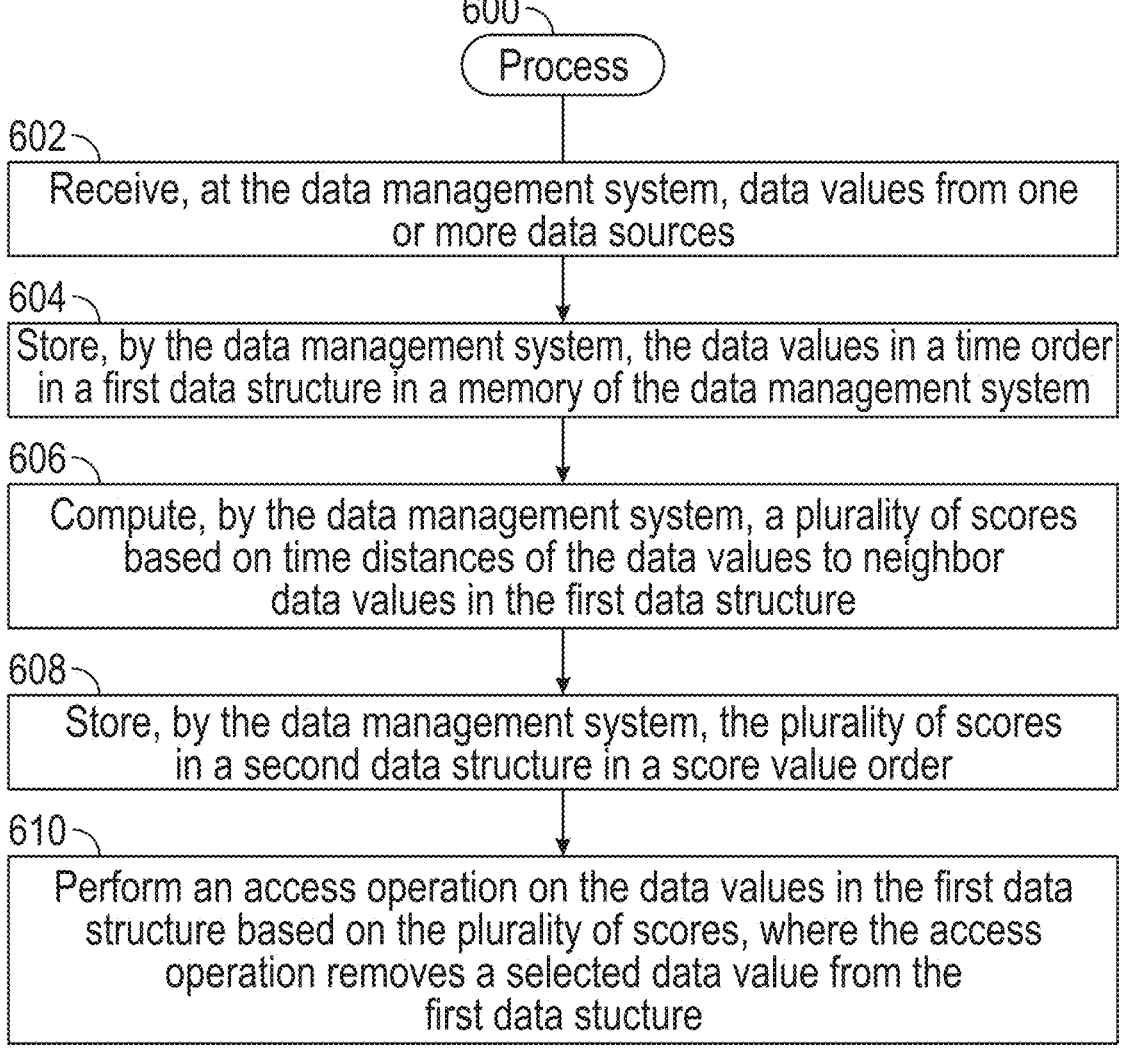

600

Process

602

Receive, at the data management system, data values from one or more data sources

604

Store, by the data management system, the data values in a time order in a first data structure in a memory of the data management system

606

Compute, by the data management system, a plurality of scores based on time distances of the data values to neighbor data values in the first data structure

608

Store, by the data management system, the plurality of scores in a second data structure in a score value order

610

Perform an access operation on the data values in the first data structure based on the plurality of scores, where the access operation removes a selected data value from the first data stucture

FIG. 6

MEMORY ACCESS OPERATIONS BASED ON SCORES

BACKGROUND

A computing environment can include various devices that perform respective tasks. Measurements relating to operations of the devices can be taken and sent to an analysis system for processing.

BRIEF DESCRIPTION OF THE DRAWINGS

Some implementations of the present disclosure are described with respect to the following figures.

FIG. 6 is a flow diagram of a process according to some examples.

Figure 1:
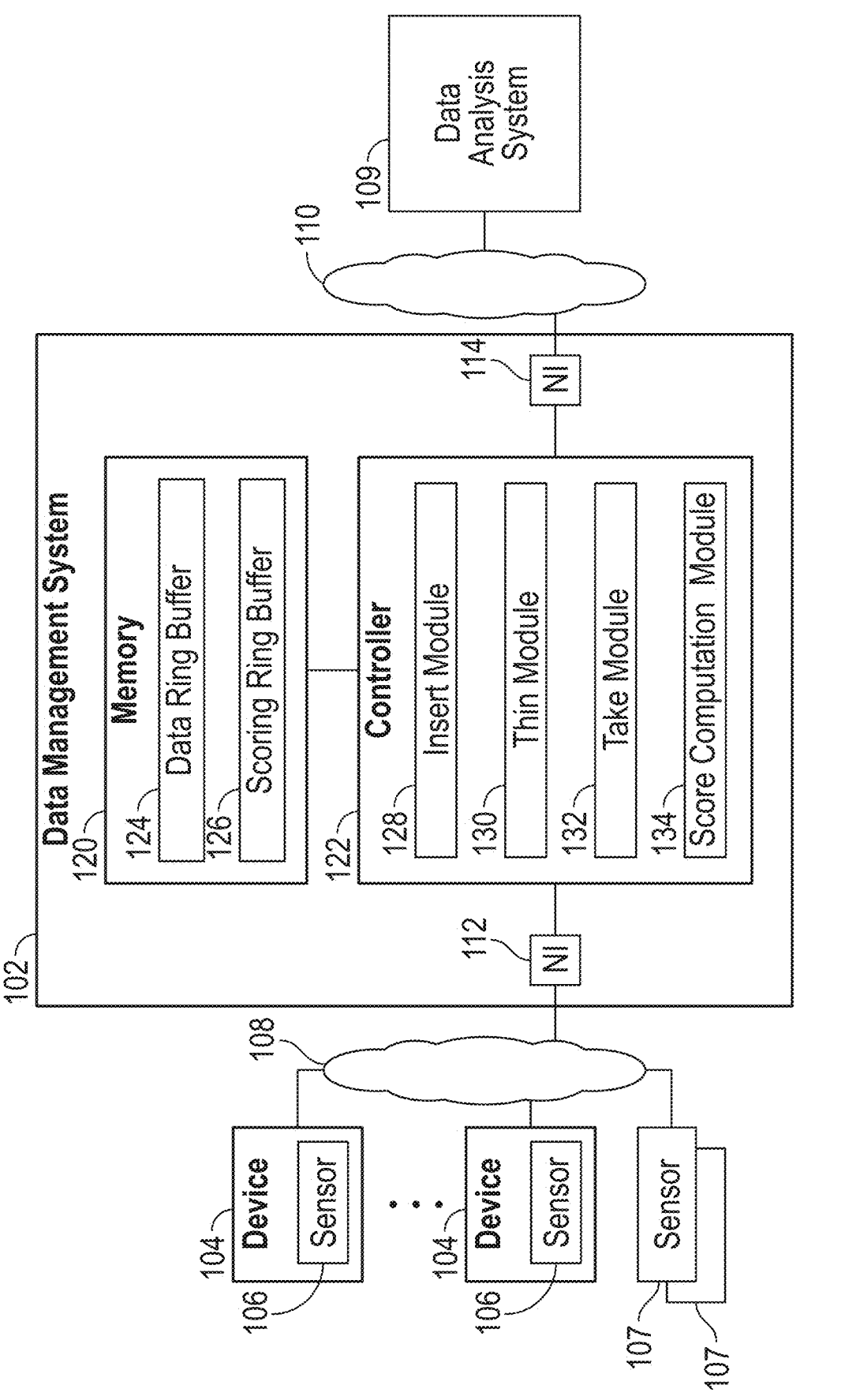
FIG. 1 is a block diagram of an arrangement that includes a data management system that receives measurement data from sensors and sends the measurement data to a data analysis system, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A data management system can be provided to receive measurement data from sensors in a computing environment. The data management system includes a memory to store (cache) the measurement data. The measurement data can be retrieved from the memory and sent from the data management system to one or more consumer devices, such as analysis systems, for processing.

The memory in the data management system has a size constraint that restricts the amount of measurement data that can be stored in the memory. If there is a large volume of measurement data from a large number of sensors, the amount of measurement data to be stored at the data management system may overwhelm the memory capacity in the data management system. The issue can be exacerbated if the data management system temporarily loses network connectivity to a data analysis system. While a network connection between the data management system and the data analysis system is down, the data management system can continue to receive measurement data, which has to be stored in the memory of the data management system. However, because the network connection is down, the data management system is unable to remove measurement data from the memory to send to the data analysis system. In some cases, once the memory is full, new measurement data may be discarded, which can result in loss of valuable information relating to operations of the devices. In other cases, a portion of the existing measurement data may be evicted from the full memory to make room for new measurement data. However, the evicted measurement data may also contain valuable information that cannot be derived from other measurement data.

In accordance with some implementations of the present disclosure, a memory of a data management system stores multiple data structures to track properties of data values that are to be sent by the data management system to a consumer device, such as a data analysis system, where the tracked properties include a time order property and a priority property that are used to determine which data values in the memory are selected for thinning and/or retrieval for sending to the consumer device. The multiple data structures in the memory include a first data structure containing data values arranged in a time order of the data values received at the data management system from sensors or from other types of data sources, and a second data structure containing a plurality of scores associated with the data values, where the scores indicate relative priorities of the data values as candidates for thinning and/or retrieval. The first data structure tracks a time property of the data values, and the second data structure tracks a priority property of the data values. The data management system includes a controller that computes a score based on time distances of an associated data value to neighbor data values in the first data structure. The controller performs an access operation on the data values in the first data structure based on the plurality of scores, where the access operation can include a thin operation to reduce a quantity of data values in the first data structure, or a retrieval operation to retrieve a data value from the first data structure to send to the consumer device.

By using the data structures according to some examples of the present disclosure, an improved data management system is provided for managing data values stored in the memory of the data management system. Arranging the data values in time order and the scores in score value order in the respective first and second data structures reduces instances in which the data management system has to sort values in the data structures.

The scores in the second data structure allow the data management system to select data values for thinning that are less important to keep in the memory. Thinning a data value in the first data structure stored in the memory refers to either evicting the data value from the first data structure or merging the data value with another data value in the first data structure. Effectively, thinning results in reducing a quantity of data values in the first data structure by removing a data value from the first data structure.

The "importance" of a data value in the memory is based on how close in time the data value is to other data values received at the data management system. A first data value that is closer in time to neighbor data values is considered less important (to keep in the memory) than a second data value that is farther in time from neighbor data values. In examples where the data values are measurement data values obtained by measurements collected by sensors, neighbor measurement data values closer in time to a given measurement data value are more likely to contain similar information as the given measurement data value. For example, latency measurement data values that measure latencies of a network that are closer in time to one another are more likely to represent similar latencies.

The scores in the second data structure also allows the data management system to select data values for retrieval to send to a consumer device, such as a data analysis system. In addition to indicating which data values are more important to keep in the memory (these data values are less likely to be thinned), the scores also indicate which data values are of more interest to the consumer device. The interestingness of a data value to a consumer device can be represented by an interestingness priority of the data value. The data values of more interest to the consumer device have higher interestingness priorities and are retrieved from the memory for sending to the consumer device before other data values that are of less interest (with lower interestingness priorities) to the consumer device. A data value is of "more interest" to the consumer device if the data value contains information that is less likely to be present in another data value in the memory. For example, a first data value that is farther in time from neighbor data values is more likely to contain information that is not present in another data value that is closer in time to neighbor data values of the other data value. As a further example in which data values are sampled in time intervals, data values that are at the beginning or end of a time interval are more likely to contain information not present in other data values within the time interval (such data values at the beginning and end of the time interval define the time interval which may not be derivable from intermediate data values in the time interval). In examples where the consumer device is a data analysis system, the data analytics applied on the data values of more interest allows for better insights to be obtained from such data values, where the insights can include troubleshooting to identify a root cause of an issue in a computing environment, determining a performance or load of the computing environment, or other insights.

The data management system according to some examples of the present disclosure is able to manage storage of data values in the memory to accommodate the capacity constraint of the memory, while ensuring that data values removed from the memory (such as for thinning or for retrieval to a consumer device) satisfy the goals of avoiding the thinning of more important data values and sending data values of more interest to a consumer device.

In some examples, the first and second data structures used by the data management system have the following properties: (1) data (e.g., data values and scores) can be inserted into the data structures, (2) a data value can be removed from the first data structure (either due to a thin operation or a retrieval operation), and (3) a data value can be removed based on a score associated with the data value.

FIG. 1 is a block diagram of an example arrangement that includes a data management system 102, devices 104, sensors 107, and a data analysis system 109. Although just one data management system 102 and one data analysis system 109 are depicted in FIG. 1, in other examples, there may be multiple data management systems and/or multiple data analysis systems.

The devices 104 can include any or some combination of the following: a desktop computer, a notebook computer, a tablet computer, a smartphone, a network device (e.g., an access point (AP), a switch, a router, a gateway, etc.), a storage system, an Internet-of-Things (IOT) device, a household appliance, a game appliance, a vehicle, or any other type of electronic device.

The devices 104 include sensors 106 that take measurements of operations in in the devices 104. The sensors 107 are not part of any devices, and the sensors 107 are able to take measurements of operations within a computing environment, such as a data center, a cloud computing environment, a network environment, a storage facility, or any other type of computing environment. A sensor can refer to a physical sensor or a sensor implemented using machine-readable instructions.

The devices 104 and the sensors 107 are connected over a network 108 to the data management system 102. The sensors 106, 107 can send measurement data values over the network 108 to the data management system 102. The data management system 102 is connected over a network 110 to the data analysis system 109.

Although reference is made to the data management system 102 receiving measurement data values acquired by sensors, it is noted that in other examples, the data management system 102 can receive other types of data values from other data sources, such as data values from a database system, data values from a machine learning model, data values from a department of an enterprise, and so forth.

The data management system 102 includes a network interface 112 to communicate over the network 108 with the devices 104 and the sensors 107, and a network interface 114 to communicate the network 110 with the data analysis system 109. A network interface can include a signal transceiver to transmit and receive signals, and one or more protocol layers that manage the communication of data according to communication protocols.

The data management system 102 includes a memory 120 and a controller 122. The memory 120 is implemented with one or more memory devices. In accordance with some examples of the present disclosure, the memory 120 stores a data ring buffer 124 and a scoring ring buffer 126. The ring buffers 124 and 126 are examples of the first and second data structures mentioned above that track a time property and priority property of data values, such as measurement data values received from the sensors 106, 107.

The data ring buffer 124 stores data values in time order as the data values are received at the data management system 102 from the sensors 106, 107. Each measurement data value is associated with a timestamp, which represents a time associated with the measurement data value. The time may represent a time at which the data value was acquired or transmitted, or a time of receipt of the data value.

The scoring ring buffer 126 contains scores associated with respective data values in the data ring buffer 124. The scores in the scoring ring buffer 126 are arranged in score value order. The scores can indicate thinning priorities of the respective data values. A higher thinning priority (represented by a lower score) indicates that the data value associated with the higher thinning priority is to be thinned before another data value with a lower thinning priority (indicated by a higher score). Stated another way, a lower score indicates that the associated data value is less important to keep in the data ring buffer 124, while a higher score indicates that the associated data value is more important to keep in the data ring buffer 124. The scores can also indicate which data values are of more interest to a consumer device, such as the data analysis system 109. A higher score indicates that the associated data value is of more interest to the consumer device, while a lower score indicates that that associated data value is of less interest to the consumer device.

A ring buffer is a data structure having a number of entries (storage elements), including a front entry and back entry at the front end and the back end, respectively, of the data structure. The front entry and the back entry of the ring buffer are logically connected to one another. The ring buffer has a start pointer that references the front entry of the ring buffer and a back pointer that references the back entry of the ring buffer. The values of the start pointer and the back pointer can be adjusted to point to different entries of the ring buffer, so that the front entry and the back entry of the ring buffer can continually change, such as when data values are inserted into or removed from the ring buffer.

The controller 122 executes various modules (implemented with machine-readable instructions) that perform operations with respect to the data ring buffer 124 and the scoring ring buffer 126. The modules include an insert module 128 to insert a data value into the data ring buffer 124, a thin module 130 to apply a thin operation to reduce a quantity of data values in the data ring buffer 124, and a take module 132 to retrieve a data value from the data ring buffer 124 to send to a consumer device, such as the data analysis system 109.

The modules further include a score computation module 134 that can be invoked by any of the insert module 128, the thin module 130, or the take module 132. When invoked, the score computation module 134 computes scores for respective data values in the data ring buffer 124, and adds the computed scores to the scoring ring buffer 126. Computation of scores can be performed in response to any of the following: an insert operation performed by the insert module 128, a thin operation performed by the thin module 130, or a retrieval operation performed by the take module 132.

Figures 2A, 2B:
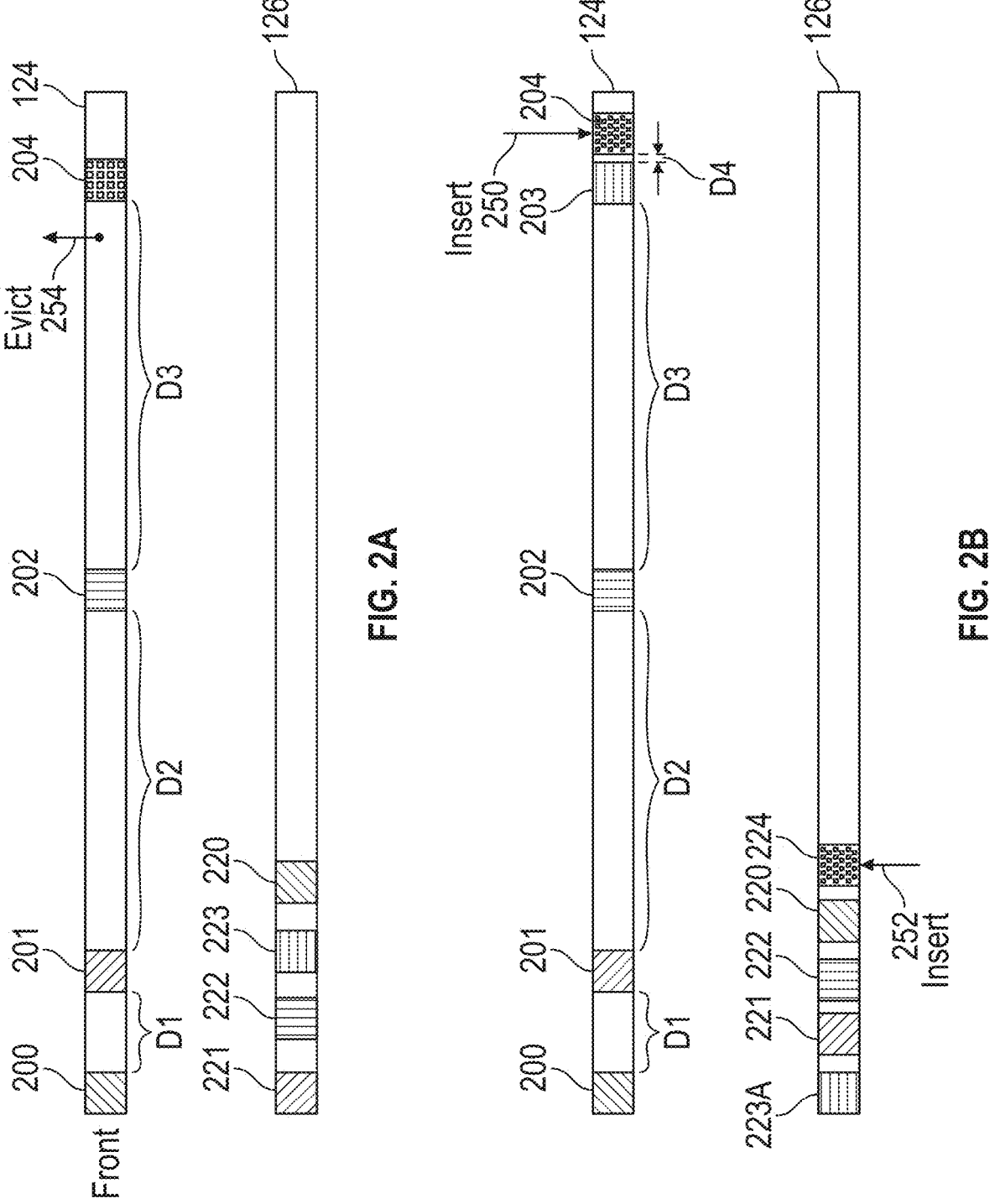
FIG. 2A to FIG. 2D are block diagrams of contents of a data ring buffer and a scoring ring buffer, in accordance with some examples.

FIG. 2A to FIG. 2D are block diagrams of contents of the data ring buffer 124 and the scoring ring buffer 126. FIG. 2A shows an initial state of the data ring buffer 124 and the scoring ring buffer 126. The data ring buffer 124 contains data values 200, 201, 202, and 204. In FIG. 2A, the data values 200, 201, 202, and 204 are in consecutive entries of the data ring buffer 124 that represent a time order of the data values. The different spacings between successive data values in the data ring buffer 124 are to logically depict different time distances between pairs of neighbor data values.

Each of the data values 200, 201, 202, and 204 is associated with metadata, which includes a timestamp of the respective data value. Based on the timestamps of the data values 200, 201, 202, and 204, time distances can be determined between the data values. In the example of FIG. 2A, a time distance D1 exists between the data values 200 and 201, a time distance D2 exists between the data values 201 and 202, and a time distance D2 exists between the data values 203 and 204. In the example of FIG. 2A, the data values 200 and 201 are closer in time to one another than the data values 201 and 202.

The data ring buffer 124 has two ends, a front end and a back end. The back entry at the back end of the data ring buffer 124 stores the most recent data value, which in FIG. 2A is the data value 203. The front entry at the front end stores the oldest data value, which in FIG. 2A is the data value 200. As a new data value is received, the new data value is inserted into the back entry of the data ring buffer 124. The data ring buffer 124 has a start pointer that references the front entry of the data ring buffer 124 and a back pointer that references the back entry of the data ring buffer 124. The start pointer and the back pointer can be changed as data values are inserted or removed. A data value can be removed by a thin operation performed by the thin module 130, or by a retrieval operation performed by the take module 132 (FIG. 1).

In some examples, timestamps are incremented as data values are acquired, transmitted, or received. In such examples, a larger timestamp represents a younger data value, whereas a smaller timestamp represents an older data value. The timestamps associated with the data values determine the order of the data values in the data ring buffer 124, i.e., the data values are stored in ascending order of their timestamps. In other examples, timestamps can be decremented as data values are acquired, transmitted, or received. In such latter examples, the data values are stored in descending order of their timestamps in the data ring buffer 124.

Whereas the data values 200, 201, 202, and 203 are arranged in time order in the data ring buffer 124, scores 221, 222, 223, and 220 associated with the respective the data values 200, 201, 202, and 203 are arranged in score value order in the scoring ring buffer 126. The lowest score (221) is stored in the front entry of the scoring ring buffer 126 (referenced by a start pointer of the scoring ring buffer 126), and the highest score (220) is stored in the back entry of the scoring ring buffer 126 (referenced by a back pointer of the scoring ring buffer 126). The score 221 is lower than the score 222, which is lower than the score 223, which is lower than the score 220.

In the example of FIG. 2A, the score 221 is associated with the data value 201, the score 222 is associated with the data value 202, the score 223 is associated with the data value 203, and the score 220 is associated with the data value 200.

The scores 221, 222, 223, and 220 indicate relative thinning priorities of the data values 201, 202, 203, and 200, respectively. Thinning a data value in the data ring buffer 124 refers to either evicting the data value from the data ring buffer 124 (which removes the data value from the data ring buffer 124) or merging the data value with another data value. Merging multiple data values refers to computing a mathematical aggregate of the multiple data values, such as an average of the data values, a sum of the data values, a maximum of the data values, a minimum of the data values, or any other aggregate.

A score for a data value is computed based on time distances between the data value and its neighbor data value(s) in the data ring buffer 124. A "neighbor" data value Y of a data value X refers to a data value that is in the next consecutive entry from the entry containing the data value X, where no other data value exists in the data ring buffer 124 between data values Y and X. Thus, for example, the data value 201 has a first neighbor data value 200 and a second neighbor data value 203, and the data value 202 has a first neighbor data value 201 and a second neighbor data value 203. Note that the data values at the ends of the data ring buffer 124 have just a single neighbor data value. More specifically, the data value 200 has one neighbor data value 201, and the data value 203 has one neighbor data value 202.

The score, Score(X), for the data value X is computed by applying a function F( ) to time distances D1X and D2X from the data value X:

$$Score(X) = F(D1X, D2X),$$

where D1X is the time distance between the data value X and its first neighbor data value (if existing) on a first side of the data value X in the data ring buffer 124, and D2X is the time distance between the data value X and its second neighbor data value (if existing) on a second side of the data value X in the data ring buffer 124. A neighbor data value (if existing) on the first side of the data value X is older than the data value X, while a neighbor data value (if existing) on the second side of the data value X is younger than the data value X. An older data value has a timestamp earlier than a younger data value.

The function F( ) can be a multiplication, a sum, or any other function. The score 221 for the data value 201 is computed by applying the function F( ) to the time distances D1 and D2. The score 222 is computed by applying the function F( ) to the time distances D2 and D3. The score 220 for the data value 200 is computed by applying the function F( ) to the time distances $D_{default}$ and D1, and similarly, the score 223 is computed by applying the function F( ) to the time distances D3 and $D_{default}$. $D_{default}$ is a default time distance used when no neighbor data value exists on one side of a given data value. The default time distance, $D_{default}$, can be a relatively large time distance value (preconfigured or specified by an entity) to ensure that high scores are generated for data values at the ends of the data ring buffer 124. In the example of FIG. 2A, no neighbor data value exists that is older than the data value 200, and no neighbor data value exists that is younger than the data value 203.

Using a relatively large default time distance, $D_{default}$, ensures that the data values in the front and back entries of the data ring buffer 124 have relatively high scores, and thus lower thinning priorities to reduce the likelihood that the data values in the front and back entries are thinned relative to other data values not at the ends of the data ring buffer 124. The data values at the ends of the data ring buffer 124 define the time interval in which multiple data values were collected. If either the data value at the front end or the back end of the data ring buffer 124 is thinned, then a consumer (e.g., the data analysis system 109) of the data values may not be able to determine the time interval in which the multiple data values were collected.

In some examples, it is assumed that scores for data values are proportional to the time distances to neighbor data values; as a result, a greater score indicates a lower thinning priority. In other examples, scores for values can be inversely proportional to the time distances to neighbor data values; in such other examples, a greater score indicates a higher thinning priority.

FIG. 2B shows an insert operation (250) that can be performed by the insert module 128 of FIG. 1. The insert module 128 triggers the insert operation (250) in response to receiving a new data value 204 at the data management system 102 from a sensor 106 or 107.

Since the new data value 204 has a timestamp later than the timestamps of the existing data values 200, 201, 202, and 203 already in the data ring buffer 124, the new data value 204 is inserted into the back entry of the data ring buffer 124 (referenced by the back pointer of the data ring buffer 124). The insert operation (250) can include a push of the new data value 204 into the back entry, which can be performed in constant, O(1), time.

Because of the insertion of the new data value 204 into the data ring buffer 124, the insert module 128 invokes the score computation module 134 to compute a new score for the new data value 204, and to update the score for the neighbor data value (203) of the new data value 204. In the initial state of FIG. 2A, the data value 203 did not have a neighbor data value on the second side of the data value 203, since the data value 203 was in the back entry of data ring buffer 124. However, as a result of the insertion of the new data value 204, the data value 203 has two neighbor data values 202 and 204. Data values 203 and 204 are separated by a time distance D4.

The score computation module 134 computes an updated score 223A for the data value 203 by applying the function F( ) on the time distances D3 and D4. The score computation module 134 computes a score 224 for the new data value based on time distances D4 and $D_{default}$. The score computation module 134 inserts (252) the score 224 into the scoring ring buffer 126, such as in the back entry of the scoring ring buffer 126 if the score 224 is greater than the score 220. However, if the score 224 is less than the score

220 but greater than the score 222, the score 224 is inserted in the back entry of the scoring ring buffer 126, but the positions of the score 224 and the score 220 are swapped such that the score 224 is before the score 220 and the score 220 is in the back entry of the scoring ring buffer 126.

Also, because the updated score 223A is now less than the score 221, the updated score 223A associated with the data value 203 is moved by the score computation module 134 to the front entry of the scoring ring buffer 126, which indicates that the data value 203 has the highest thinning priority (i.e., the data value 203 is to be thinned before other data values in the data ring buffer 124). Moving a value (such as a score) in a ring buffer can be accomplished using swap operations of the ring buffer, in which values in respective entries of the ring buffer are swapped in position. Swap operations can be performed in O(n) time, where n represents the quantity of moves (e.g., swaps) involved.

Figures 2C, 2D:
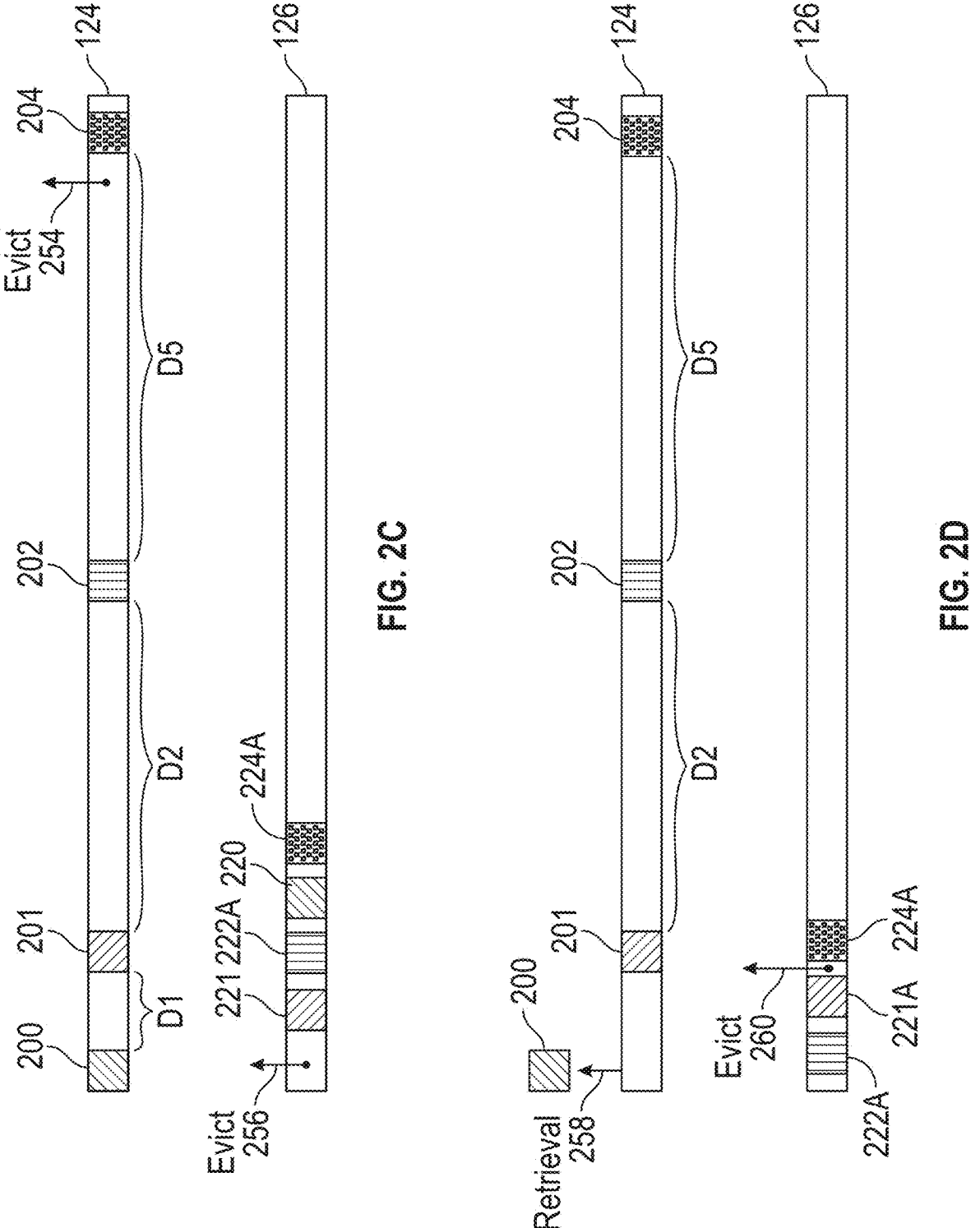

FIG. 2C shows an example thin operation performed by the thin module 130. More specifically, the thin operation includes an evict operation (254) that removes the data value 203 from the data ring buffer 124. The evict operation (254) can include a pop of the data value 203 from the data ring buffer 124, which can be performed in constant, O(1), time. In some examples, the thin module 130 can perform a thin operation in response to the data ring buffer 124 becoming full (e.g., due to the addition of the new data value 204 in FIG. 2B), at the request of an entity such as a human, a program, or a machine, or in response to any other event.

The thin module 130 selects a data value to evict from the data ring buffer 124 based on the scores to 223A, 221, 222, 220, and 224 in the scoring ring buffer 126. Since the scores are arranged in score value order in the scoring ring buffer 126 (with the smallest score in the front entry of the scoring ring buffer 126), the thin module 130 can simply access the front entry of the scoring ring buffer 126 to identify which data value (in this case 203) is associated with the score 223A in the front entry of the scoring ring buffer 126. Note that the scores in the scoring ring buffer 126 are associated with respective metadata, including a reference to the associated data value. Thus, the score 223A is associated with metadata that includes a reference to the data value 203, the score 221 is associated with metadata that includes a reference to the data value 201, the score 222 is associated with metadata that includes a reference to the data value 202, the score 220 is associated with metadata that includes a reference to the data value 200, and the score 224 is associated with metadata that includes a reference to the data value 204. The reference to the data value can be an index value that identifies an entry of the data value in the data ring buffer 124.

As shown in FIG. 2C, the thin module 130 evicts (254) the data value 203 from the data ring buffer 124, and evicts (256) the score 223A from the scoring ring buffer 126. Evicting a value from a ring buffer can be performed using a pop of the value from the ring buffer, which can be performed in constant, O(1), time.

As a result of the eviction of the data value 203, the neighbors of the data values 202 and 204 are changed. More specifically, the data value 202 has neighbor data values 201 and 204, and the data value 204 has a neighbor data value 202 on its first side. A time distance D5 exists between the data values 202 and 204 as a result of the eviction of the data value 203.

The thin module 130 invokes the score computation module 134 to update scores for data values whose neighbors changed due to the eviction of the data value 203. The score computation module 134 computes an updated score 222A by applying the function F( ) to time distances D2 and D5, and computes an updated score 224A by applying the function F( ) to time distances D5 and $D_{default}$. The updated scores 222A and 224A are stored in the scoring ring buffer 126. Note that it may be possible that scores would have to be moved around in the scoring ring buffer 126 if relative values of the scores in the scoring ring buffer 126 change due to updates of one or more of the scores.

FIG. 2D shows an example retrieval operation (258) performed by the take module 132 of FIG. 1. The retrieval operation (258) can be invoked to send data values to the data analysis system 109, for example. The data value selected for retrieval to send to the data analysis system 109 is based on the scores remaining in the scoring ring buffer 126, which in FIG. 2C includes the scores 221, 222, 220, and 224 (after the eviction of the score 223A). In some examples, the data value selected for retrieval is at either end (front end or back end) of the data ring buffer 124. Thus, the take module 132 can retrieve either the data value 200 or the data value 204 from the data ring buffer 124. This retrieval operation can include a pop from the data ring buffer 124. Note that the largest scores in the scoring ring buffer 126 are the scores 220 and 224A corresponding to the data values 200 and 204. Depending on which of the data values 200 and 204 is selected, the take module 132 can either pop the data value 200 from the front entry of the data ring buffer 124, or pop the data value 204 from the back entry of the data ring buffer 124. In either case, the retrieval operation (258) can be performed in constant, O(1), time. the take module 132 selects one the data values in the front entry and the back entry of the data ring buffer 124 for retrieval based on any of various criteria, including any or some combination of: which of the scores of the data values in the front entry and the back entry is largest, a criterion specified by a consumer (e.g., the data analysis system 109) of the data values that indicates a preference for retrieving from the front or back ends of the data ring buffer 124, or any other criterion.

Assuming the take module 132 selected the data value 200 for retrieval, the take module 132 also evicts (at 260) the score 220 from the scoring ring buffer 126. In addition, the take module 132 invokes the score computation module 134 to compute updated scores. As a result of removing the data value 200 from the data ring buffer 124 in the retrieval operation (258), the neighbors of the data value 201 has changed. The data value 201 now has just one neighbor data value (202); there is no neighbor data value on the first side of the data value 201. The score computation module 134 computes an updated score 221A for the data value 201 by applying the function F( ) to time distances $D_{default}$ and D2. The updated score 221A is stored in the scoring ring buffer 126. Because the updated score 221A is greater than the score 222A, the positions of the scores 221A and 222A are swapped in the scoring ring buffer 126.

Figure 3:
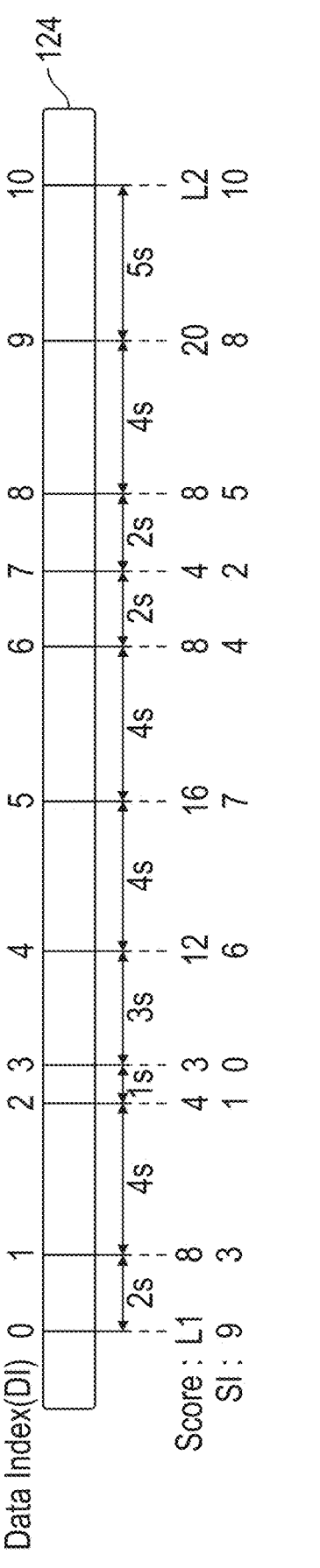
FIG. 3 is a block diagram of contents of a data ring buffer and a scoring ring buffer, in accordance with further examples.
Figure 3:
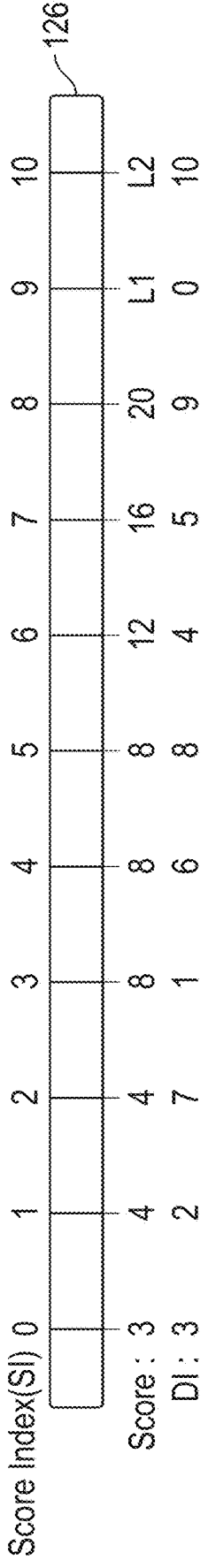

FIG. 3 is a block diagram of example contents of the data ring buffer 124 and the scoring ring buffer 126. The data ring buffer 124 has data index (DI) values (0 to 10) that refer to respective entries of the data ring buffer 124. More specifically, DI 0 refers to entry 0 of the data ring buffer 124, DI 1 refers to entry 1 of the data ring buffer 124, and so forth. Example time distances between data values in respective entries are shown in FIG. 3. The time distance between the data values in entries 0 and 1 is 2 seconds(s), the time distance between the data values in entries 1 and 2 is 4s, the time distance between the data values in entries 2 and 3 is 1s, the time distance between the data values in entries 3 and 4 is 3s, the time distance between the data values in entries 4 and 5 is 4s, the time distance between the data values in entries 5 and 6 is 4s, the time distance between the data values in entries 6 and 7 is 2s, the time distance between the data values in entries 7 and 8 is 2s, the time distance between the data values in entries 8 and 9 is 4s, and the time distance between the data values in entries 9 and 10 is 5s.

FIG. 3 also shows scores computed for the data values in the respective entries 0 to 10 of the data ring buffer 124. The score for the data value in entry 0 is L1, which is computed based on multiplying $D_{default}$ by 2s; the score for the data value in entry 1 is 8, which is computed based on multiplying 2s by 4s; the score for the data value in entry 2 is 4, which is computed based on multiplying 4s by 1s; the score for the data value in entry 3 is 3, which is computed based on multiplying 1s by 3s; the score for the data value in entry 4 is 12, which is computed based on multiplying 3s by 4s; the score for the data value in entry 5 is 16, which is computed based on multiplying 4s by 4s; the score for the data value in entry 6 is 8, which is computed based on multiplying 4s by 2s; the score for the data value in entry 7 is 4, which is computed based on multiplying 2s by 2s; the score for the data value in entry 8 is 8, which is computed based on multiplying 2s by 4s; the score for the data value in entry 9 is 20, which is computed based on multiplying 4s by 5s; and the score for the data value in entry 10 is L2, which is computed based on multiplying 5s by $D_{default}$.

Each data value in an entry of the data ring buffer 124 is associated with metadata that includes references to entries of the scoring ring buffer 126. The scoring ring buffer 126 has score index (SI) values (0 to 10) that refer to respective entries of the scoring ring buffer 126. More specifically, SI 0 refers to entry 0 of the scoring ring buffer 126, SI 1 refers to entry 1 of the scoring ring buffer 126, and so forth. The references in the metadata associated with the data values in the data ring buffer 124 include the SI values. For example, the reference in the metadata associated with the data value in entry 0 of the data ring buffer 124 includes SI 9, which specifies that the score for the data value in entry 0 of the data ring buffer 124 is in entry 9 of the scoring ring buffer 126; the reference in the metadata associated with the data value in entry 1 of the data ring buffer 124 includes SI 3, which specifies that the score for the data value in entry 1 of the data ring buffer 124 is in entry 3 of the scoring ring buffer 126; the reference in the metadata associated with the data value in entry 2 of the data ring buffer 124 includes SI 1, which specifies that the score for the data value in entry 2 of the data ring buffer 124 is in entry 1 of the scoring ring buffer 126; and so forth. A module (e.g., any of the modules 128 to 134) executed by the controller 122 can quickly find in constant, O(1), time the score for any data value in the data ring buffer 124 by using the SI value in the metadata associated with the data value.

The scoring ring buffer 126 stores scores in respective entries of the scoring ring buffer 126. Each score in the scoring ring buffer 126 is associated with metadata that includes a reference (in the form of a DI value) that refers to an entry of the data ring buffer 124. For example, the reference in the metadata associated with the score in entry 10 of the scoring ring buffer 126 includes DI 10, which specifies that the associated data value is in entry 10 of the data ring buffer 124; the reference in the metadata associated with the score in entry 5 of the scoring ring buffer 126 includes DI 8, which specifies that the associated data value is in entry 8 of the data ring buffer 124; the reference in the metadata associated with the score in entry 2 of the scoring ring buffer 126 includes DI 7, which specifies that the associated data value is in entry 7 of the data ring buffer 124; and so forth. A module (e.g., any of the modules 128 to 134)

executed by the controller 122 can quickly find in constant, O(1), time the data value for any score in the scoring ring buffer 126 by using the DI value in the metadata associated with the score.

Figures 4, 5:
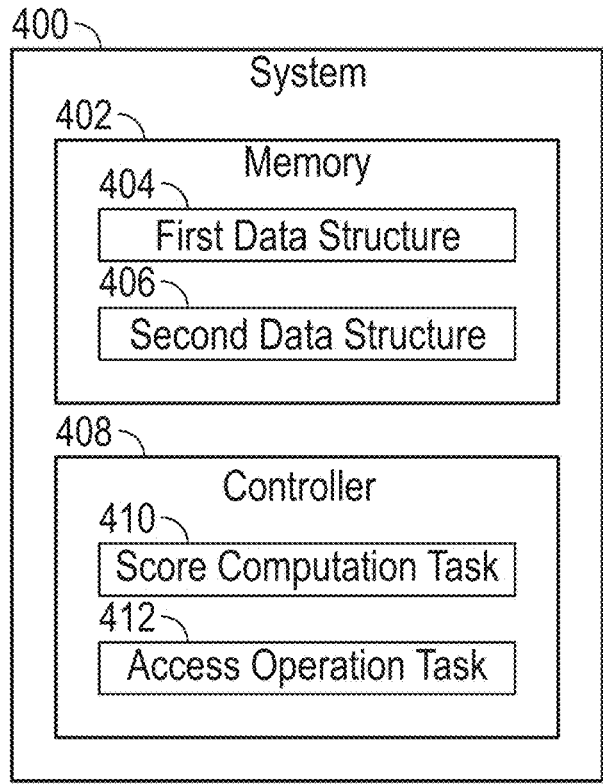
FIG. 4 is a block diagram of a system according to some examples.
FIG. 5 is a block diagram of a storage medium storing machine-readable instructions according to some examples.

FIG. 4 is a block diagram of a system 400, which can be implemented using one or more computers. An example of the system 400 is the data management system 102 of FIG. 1. The system 400 includes a memory 402 to store a first data structure 404 containing data values received from one or more data sources, and a second data structure 406 containing a plurality of scores associated with the data values. The data values in the first data structure 404 are arranged in a time order of the data values. The memory 402 can be implemented using one or more memory devices, such as a dynamic random access memory (DRAM) device, a static random access memory (SRAM) device, a flash memory device, a solid state drive, a disk-based storage device, or any other device to store data. Examples of the first and second data structures 404 and 406 include ring buffers.

The system 400 further includes a controller 408 to perform various tasks. The controller 408 can include one or more hardware processing circuits, which can include any or some combination of a microprocessor, a core of a multi-core microprocessor, a microcontroller, a programmable integrated circuit, a programmable gate array, or another hardware processing circuit. Alternatively, the controller 408 can include a combination of one or more hardware processing circuits and machine-readable instructions (software and/or firmware) executable on the one or more hardware processing circuits.

The tasks of the controller 408 include a score computation task 410 to compute a score of the plurality of scores based on time distances of an associated data value to neighbor data values in the first data structure. For example, the score for the associated data value with two neighbors is computed by applying a function on a first time distance to a first neighbor data value on a first side of the associated data value in the first data structure 404, and a second time distance to a second neighbor data value on a second side of the associated data value in the first data structure 404. In another example, the score for a data value in an end entry (e.g., front entry or back entry) of the first data structure 404 is computed by applying a function on a time distance to a neighbor data value on a first side of the data value in the end entry, and a default time distance (e.g., $D_{default}$) representing an absence of a neighbor data value on a second side of the data value in the end entry.

The tasks of the controller 408 include an access operation task 412 to perform an access operation on the data values in the first data structure based on the plurality of scores. The access operation can include a thin operation (e.g., performed by the thin module 130 in FIG. 1) or a retrieval operation (e.g., performed by the take module 132 in FIG. 1). The thin operation reduces a quantity of the data values in the first data structure 404. The retrieval operation retrieves a data value from the first data structure 404 to send to a consumer device.

In some examples, the thin operation includes evicting a data value from the first data structure 404, or merging multiple data values in the first data structure 404 into a merged data value.

In some examples, as a result of the thin operation, the controller 408 reduces a quantity of scores in the second data structure 406 to correspond to the reduced quantity of the data values in the first data structure 404.

In some examples, the controller 408 computes an updated score for a data value in the first data structure responsive to the thin operation.

In some examples, the plurality of scores indicate relative thinning priorities of the data values in the first data structure, where a higher thinning priority of a first data value indicates that the first data value is to be thinned before a second data value with a lower thinning priority.

In some examples, the plurality of scores indicate relative interestingness priorities of the data values in the first data structure, where the data value retrieved by the retrieval operation has a higher interestingness priority than another data value in the first data structure.

In some examples, the controller 408 (e.g., when executing the insert module 128 of FIG. 1) inserts a new data value into the first data structure 404. The controller 408 computes an updated score for a given data value in the first data structure 404 based on a first time distance of the given data value to the new data value and a second time distance of the given data value to another data value in the first data structure 404. The controller 408 moves the updated score for the given data value in the second data structure 406 based on a value of the updated score relative to values of other scores in the second data structure.

In some examples, the new data value is inserted into the first data structure 404 at an end entry (e.g., front entry or back entry) of the first data structure 404 such that the new data value has a single neighbor data value, the single neighbor data value being the given data value. The controller 408 computes a new score for the new data value based on the first time distance of the given data value to the new data value, and a default time distance that represents an absence of another neighbor data value to the new data value. The controller 408 inserts the new score into second data structure 406 into an entry of the second data structure 406, while maintaining the score value order of scores in the second data structure 406.

FIG. 5 is a block diagram of a non-transitory machine-readable or computer-readable storage medium 500 storing machine-readable instructions that upon execution cause a data management system to perform various tasks.

The machine-readable instructions include data values reception instructions 502 to receive data values from one or more data sources. The one or more data sources can include sensors or other types of data sources.

The machine-readable instructions include data values buffering instructions 504 to store the data values in a time order in a first data structure in a memory of the data management system. An example of the first data structure is the data ring buffer 124 of FIG. 1.

The machine-readable instructions include scores computation instructions 506 to compute a plurality of scores based on time distances of the data values to neighbor data values in the first data structure. A score is computed based on applying a function to time distances.

The machine-readable instructions include scores storage instructions 508 to store the plurality of scores in a second data structure in a score value order. An example of the second data structure is the scoring ring buffer 126 of FIG. 1.

The machine-readable instructions include access operation instructions 510 to perform an access operation on the data values in the first data structure based on the plurality of scores. The access operation includes a thin operation or a retrieval operation.

In some examples, the first data value selected for the thin operation is stored in an intermediate entry of the first data structure between end entries of the first data structure. For example, in FIG. 2A, entries containing the data values 201 and 202 are intermediate entries between end entries containing the data values 200 and 203.

FIG. 6 is a flow diagram of a process 600 according to some examples of the present disclosure. The process 600 can be performed by the data management system 102, for example.

The process 600 includes receiving (at 602), at the data management system, data values from one or more data sources. The process 600 includes storing (at 604), by the data management system, the data values in a time order in a first data structure in a memory of the data management system. If the first data structure is a first ring buffer, then a data value can be pushed into a back entry of the first ring buffer as the data value is received.

The process 600 includes computing (at 606), by the data management system, a plurality of scores based on time distances of the data values to neighbor data values in the first data structure. A first score for a first data value in an end entry of the first data structure is based on a time distance of the first data value to a neighbor data value on a first side of the first data value in the first data structure, and a default time distance representing an absence of a neighbor data value on a second side of the first data value in the first data structure, and a second score for a second data value in an intermediate entry of the first data structure is based on a time distance of the second data value to a first neighbor data value on a first side of the second data value in the first data structure, and a time distance of the second data value to a second neighbor data value on a second side of the second data value in the first data structure.

The process 600 includes storing (at 608), by the data management system, the plurality of scores in a second data structure in a score value order. If the second data structure is a second ring buffer, the lowest score may be stored in a front entry of the second ring buffer, while the highest score may be stored in a back entry of the second ring buffer.

The process 600 includes performing (at 610) an access operation on the data values in the first data structure based on the plurality of scores, where the access operation removes a selected data value from the first data structure.

A storage medium (e.g., 400 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   a memory to store a first data structure containing data values received from one or more data sources, and a second data structure containing a plurality of scores associated with the data values, the data values in the first data structure arranged in a time order of the data values; and
   a controller to:
   compute a score of the plurality of scores based on time distances of an associated data value to neighbor data values in the first data structure, and
   perform an access operation on the data values in the first data structure based on the plurality of scores, wherein the plurality of scores are ordered in the second data structure according to score values of the plurality of scores;
   insert a new data value into the first data structure,
   compute an updated score for a given data value in the first data structure based on a first time distance of the given data value to the new data value and a second time distance of the given data value to another data value in the first data structure, and
   move the updated score for the given data value in the second data structure based on a value of the updated score relative to values of other scores in the second data structure.

2. The system of claim 1, wherein the access operation comprises a thin operation to reduce a quantity of the data values in the first data structure.

3. The system of claim 2, wherein the thin operation comprises evicting a data value from the first data structure, or merging multiple data values in the first data structure into a merged data value.

4. The system of claim 2, wherein the controller is to:
   as a result of the thin operation, reduce a quantity of scores in the second data structure to correspond to the reduced quantity of the data values in the first data structure.

5. The system of claim 4, wherein the controller is to:
   compute an updated score for a data value in the first data structure responsive to the thin operation.

6. The system of claim 2, wherein the plurality of scores indicate relative thinning priorities of the data values in the first data structure, and wherein a higher thinning priority of a first data value indicates that the first data value is to be thinned before a second data value with a lower thinning priority.

7. The system of claim 1, wherein the access operation comprises a retrieval operation that retrieves a data value from the first data structure and sends the retrieved data value to a consumer device.

8. The system of claim 7, wherein the plurality of scores indicate relative interestingness priorities of the data values in the first data structure, and wherein the data value retrieved by the retrieval operation has a higher interesting-ness priority than another data value in the first data struc-ture.

9. The system of claim 1, wherein the first data structure comprises a first ring buffer containing the data values.

10. The system of claim 9, wherein the second data structure comprises a second ring buffer containing the plurality of scores.

11. The system of claim 1, wherein the new data value is inserted into the first data structure at an end entry of the first data structure such that the new data value has a single neighbor data value, the single neighbor data value being the given data value, and wherein the controller is to:

compute a new score for the new data value based on the first time distance of the given data value to the new data value, and a default time distance that represents an absence of another neighbor data value to the new data value, and insert the new score into the second data structure into an entry of the second data structure.

12. The system of claim 1, wherein the controller is to:

compute the score by applying a function on the time distances of the associated data value to the neighbor data values in the first data structure.

13. A method comprising:

receiving, at a data management system, data values from one or more data sources;

storing, by the data management system, the data values in a time order in a first data structure in a memory of the data management system;

computing, by the data management system, a plurality of scores based on time distances of the data values to neighbor data values in the first data structure, wherein a first score for a first data value in an end entry of the first data structure is based on a time distance of the first data value to a neighbor data value on a first side of the first data value in the first data structure, and a default time distance representing an absence of a neighbor data value on a second side of the first data value in the first data structure, and wherein a second score for a second data value in an intermediate entry of the first data structure is based on a time distance of the second data value to a first neighbor data value on a first side of the second data value in the first data structure, and a time distance of the second data value to a second neighbor data value on a second side of the second data value in the first data structure;

storing, by the data management system, the plurality of scores in a second data structure in a score value order; and perform an access operation on the data values in the first data structure based on the plurality of scores, wherein the access operation removes a selected data value from the first data structure; and computing, by the data management system, an updated score for a given data value in the first data structure based on a changed time distance of the given data value to a neighbor data value caused by the removal of the selected data value from the first data structure.

* * * * *